UNITED STATES PATENT OFFICE.

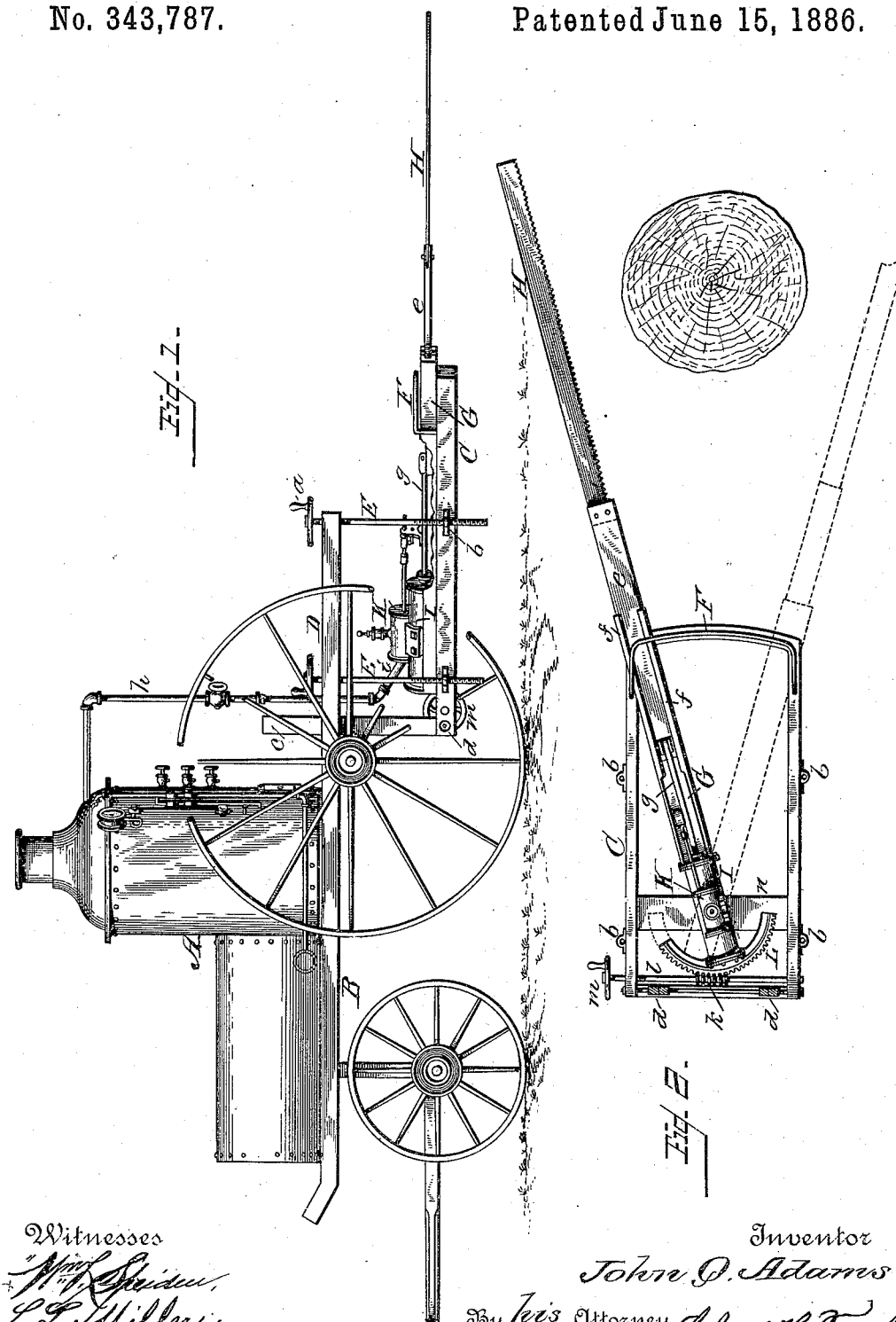

JOHN Q. ADAMS, OF SAGINAW, MICHIGAN.

MACHINE FOR SAWING OFF STUMPS.

SPECIFICATION forming part of Letters Patent No. 343,787, dated June 15, 1886.

Application filed February 19, 1886. Serial No. 192,537. (No model.)

*To all whom it may concern:*

Be it known that I, JOHN Q. ADAMS, a citizen of the United States, residing at Saginaw, in the county of Saginaw and State of Michigan, have invented certain new and useful Improvements in Machines for Sawing Off Stumps; and I do hereby declare that the following is a full, clear, and exact description of the same, reference being had to the annexed drawings, making a part of this specification, and to the letters and figures of reference marked thereon.

Figure 1 of the drawings is a side elevation of my improved machine complete for cutting off stumps of trees by steam-power; and Fig. 2, a top plan view thereof with the steam-boiler and carriage removed.

The object of the present invention is to provide a machine operated by steam-power for cutting off the stumps of trees that are now wasted, thereby saving and utilizing the timber by cutting the stumps off to the ground in lengths suitable to be sawed into shingles, box-lumber, &c.; and the invention consists in the several details of construction substantially as shown in the drawings, and hereinafter described and claimed.

In the accompanying drawings, A represents the steam-boiler, of any of the usual forms, mounted upon a suitable carriage, B, in order to render it portable. A suitable frame, C, is suspended from beams D, projecting from the rear of the carriage B, and form a frame, upon which the boiler A is supported. The frame C is connected to the beams D by means of screw-rods E, the upper ends thereof having cranks $a$, hand-wheels, or other suitable means for turning them. The screw-threaded portion of the rods E or the lower ends thereof engage with screw-threaded nuts $b$, attached to the sides of the frame C, and at one end of the frame are upright guides $c$, extending up through slots in the frame that supports the boiler A. By means of the screw-rods E the frame C can be raised or lowered, the guides $c$ being hinged at $d$ to the frame. The forward end of the frame C is provided with a guide, F, and between this guide and the upper side of the frame is located one end of a rectangular platform, G. This platform at one end supports the shank $e$ of the saw H, held thereon by flanges $f$, which also form guides for the shank. The saw-shank $e$ is suitably connected to the outer end of the piston-rod $g$ of the steam-cylinder I, which is also connected to and supported by the platform G, and above the cylinder is a steam-chest, K, to which steam is supplied through pipe $h$. One end of the pipe $h$ communicates with the boiler A, and the lower end, by means of the rubber tube $i$, communicates with the chest K. The steam-cylinder at one end has secured to it a toothed segment, L, which engages with a worm, $k$, on a rod, $l$, one end of said rod being provided with a hand-wheel or crank, $m$, for turning it. The steam-cylinder I, or frame G upon which it is supported, is pivoted to a transverse brace, $n$, of the frame C, and by means of the rod $l$, worm $k$, and toothed segment L the saw H is brought to any position on the arc of a circle required, the rubber-tube connection $i$ between the pipe and steam-chest enabling the frame G to move the required distance in either direction, and admit of the raising and lowering of the frame C.

The valves in the steam-chest are those in ordinary use and operate in the usual manner, and when the machine is in use it is backed up to the stump desired to be sawed off, and, by means of the adjusting-screws E, the saw is set to any required height or plane, after which the steam is turned on and the saw fed through the stump by means of the toothed segment L, worm $k$, and the rod $l$.

Having now fully described my invention, what I claim as new, and desire to secure by Letters Patent, is—

1. In a machine for sawing off stumps, a steam-boiler mounted upon a suitable carriage, and a frame connected thereto by adjusting screw-rods, and hinged at one end to upright guides, in combination with a saw, and a steam chest and cylinder communicating with the boiler and operating the saw, substantially as and for the purpose specified.

2. In a machine for sawing off stumps, a steam-boiler mounted upon a suitable carriage, and a frame adjustably connected to the frame of the carriage, in combination with a pivoted rectangular frame, a saw, steam-cylinder, and chest supported thereby, a toothed rack, and a worm-shaft for controlling the adjustment of the frame, substantially as and for the purpose set forth.

In testimony that I claim the above I have hereunto subscribed my name in the presence of two witnesses.

JOHN Q. ADAMS.

Witnesses:
 FRED. WELINGTON,
 F. A. KING.